United States Patent

[11] 3,625,267

[72] Inventor Robert E. Welborn
 Lafayette, Ind.
[21] Appl. No. 884,218
[22] Filed Dec. 11, 1969
[45] Patented Dec. 7, 1971
[73] Assignee Wayne Manufacturing Company
 Pomona, Calif.

[54] STUMP REMOVAL MACHINE
 11 Claims, 3 Drawing Figs.

[52] U.S. Cl. .................................................. 144/2 N,
 143/43 S
[51] Int. Cl. ...................................................... A01g 23/06

[50] Field of Search ........................................ 144/2 N, 2;
 143/43 S

[56] References Cited
 UNITED STATES PATENTS
 3,308,860  3/1967  De Shano .................... 144/2 N Primary Examiner—Donald R. Schran
Attorney—White & Haefliger ABSTRACT: A vehicle-mounted stump removal machine employs a cutter-carrying boom mounted for lateral swinging above the vehicle wheels, the boom being carried by a cradle or supporting structure mounted for oscillation about the vehicle wheel axis to control the operating depth of the cutter.

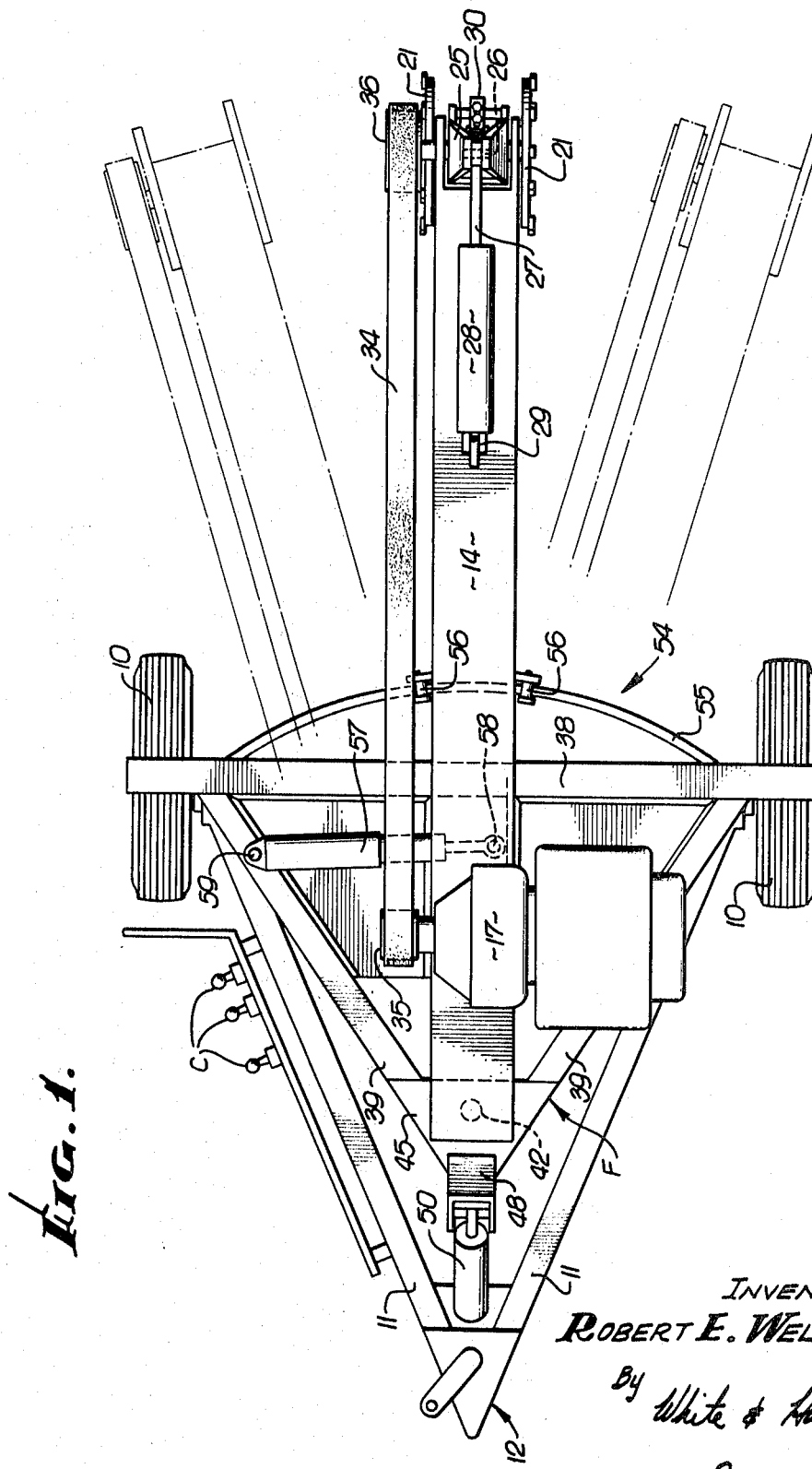

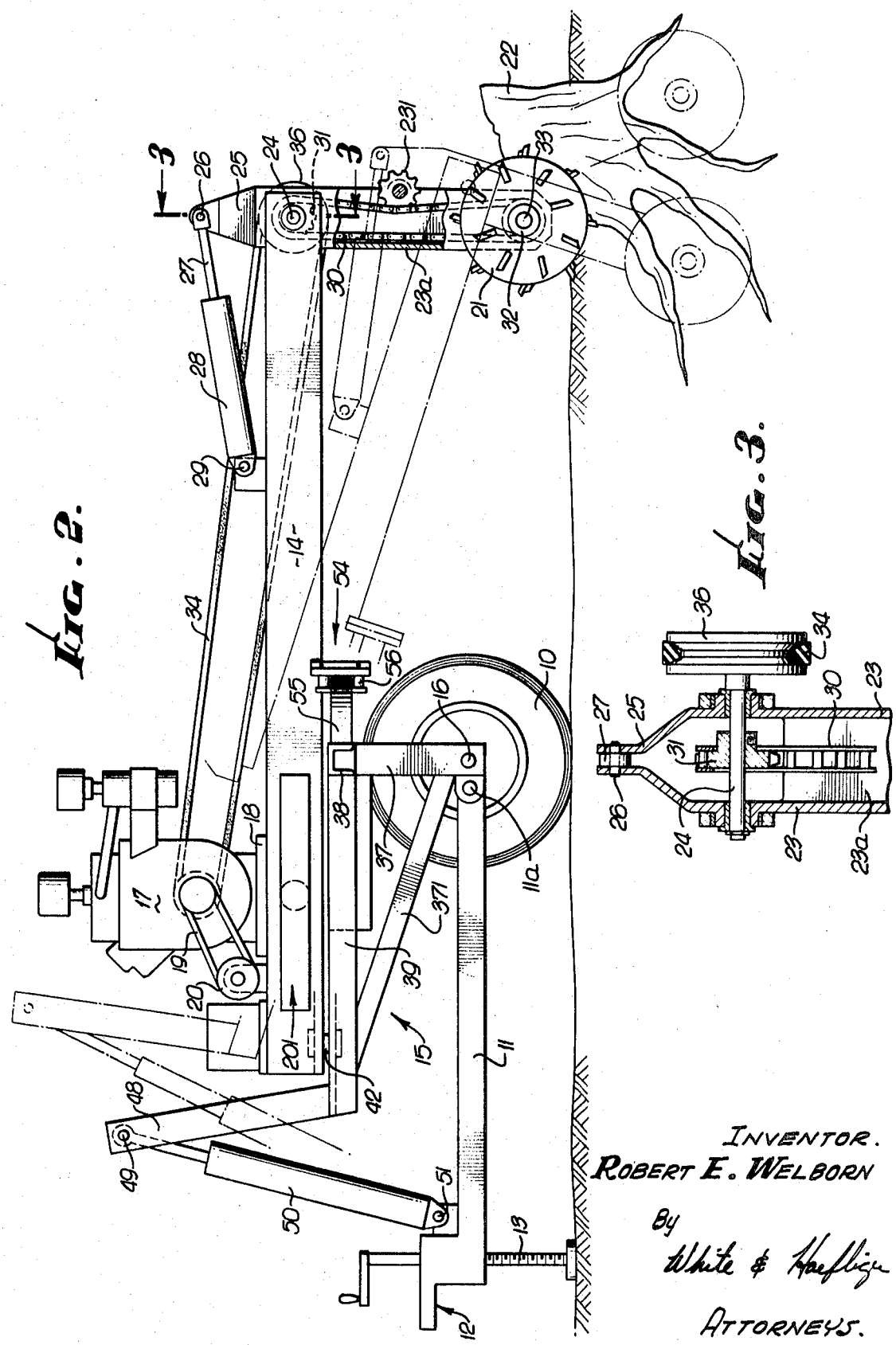

STUMP REMOVAL MACHINE

BACKGROUND OF THE INVENTION

The invention has in common with prior stump removal machines employing a powered stump-disintegrating cutter, mounting of the machine components on a two-wheel trailer having a forward draft connection and at its rear a cutter carrier operable to move the cutter both vertically and laterally to transverse the stump in its cutting action.

Prior machines of this type have achieved these briefly stated cutter movements by the use of mechanisms of relatively complex and expensive construction and which have lacked certain performance flexibilities found to be desirable and which have occasioned development of the present machine.

SUMMARY OF THE INVENTION

The invention has for its general object to provide a stump cutter machine in which the operating parts are reduced to simple and economical construction having operating features, conveniences and ranges heretofore unattainable by prior machines of this type.

More specifically, the invention has for its object to provide a novel construction employing a boom extending forwardly and rearwardly of the vehicle wheel axis and mounted to swing vertically to control the cutter operating depth, and laterally to effect the cutter sweep across a stump being disintegrated.

A further feature and object is mounting of the boom above the wheel axis, and to particular benefit above the wheels so that in its lateral swing the boom avoids interference by the wheels.

Structurally, the invention contemplates mounting the boom on a cradle or carriage capable of oscillation longitudinally of the vehicle axis, and a further and particular object is to mount the carriage for such oscillation about the vehicle wheel axis.

The invention has various additional features and objects such as carriage support given the boom in its lateral swinging movements, and the manner of power driving the cutter as well as controlling the oscillatory carrier positions, all of which will be readily understood from the following detailed description of an illustrative embodiment of the invention shown by the accompanying drawings.

BRIEF DESCRIPTION OF THE DRAWINGS

FIG. 1 is a plan view of the machine with the boom swing illustrated in broken lines;

FIG. 2 is a side elevation of FIG. 1 showing the cutter engaged with a stump; and FIG. 3 is a fragmentary section on line 3—3 of FIG. 2.

DESCRIPTION OF THE PREFERRED EMBODIMENTS

The machine components are shown to be transportable by a trailer-type vehicle having axially aligned wheels 10 and a forward draft A-frame having convergent members 11 suitably connectable at 12 to a pulling vehicle, the frame when the machine is in use being stabilized by jack 13 carried by the frame. Members 11 have pivotal connections 11a with supports 37, and may mount controls C for the hydraulically actuated devices employed for operation of the machine components as will appear.

The mechanisms include an elongated boom 14 mounted on a carriage structure generally indicated at 15 above the wheel axis 16 and preferably at an elevation above the wheels 10 so that the horizontal or lateral swing range of the boom can be free of interference by the wheels. Power for operation of the machine components is derived from engine 17 having its base 18 supported on the boom, the engine having drive connection 19 with an hydraulic pump 20 also carried by the boom. The latter may contain an accommodation for fuel and oil generally indicated at 201.

At its rear end the boom mounts cutters 21 of known type rotatable to disintegrate the stump 22. The cutters are carried by spacer arms 23 interconnected at one side by portion 23a of the arm assembly which depends from the boom and is mounted for oscillation about shaft 24. The arms 23 have upper yoke extensions 25 pivoted at 26 to the shaft 27 of hydraulic cylinder 28 which in turn is pivoted at 29 to the boom. Upon actuation by hydraulic fluid supplied from the pump 20, the cylinder 28 operates to swing cutters 21 and arms 23 longitudinally of the boom to effect the cutter traverse across the stump 22. The cutters are shown to be driven by chain 30 extending past idler 231 about sprocket 31 on shaft 24 and about the sprocket 32 carried by the cutter shaft 33. Sprocket 31 and the chain are driven from the engine 17 by way of belt 34 carried by sheaves 35 and 36.

The carriage structure 15 comprises a pair of arms 37 having braces 371 and depending from transverse member 38, the arms being pivoted for oscillation about the wheel axis 16. Forwardly of member 38 the carriage includes an A-configuration frame F comprising members 39 converging to an apex as illustrated in FIG. 1. The boom 14 is pivoted at 42 to the carriage A-frame at the convergence of members 39 to gusset 45 which mounts the boom pivot. At its rear the carriage has a rigid upwardly extending arm 48 to which is pivotally connected at 49 an hydraulic cylinder 50 connected at 51 to the draft frame and operable to oscillate the carriage about its pivot at 16, thus to swing the boom vertically as between the solid and broken line positions appearing in FIG. 2. Forwardly of the arms 37 and the carriage frame member 38 the carriage mounts a suitable means generally indicated at 54 for supporting the boom 14 throughout the range of its lateral swinging movement. The support at 54 is shown in FIG. 1 to comprise arcuate trace 55 joined to member 38 and adapted to be traveled by rollers 56 mounted to the sides of the boom. The boom is actuated in its lateral swing by hydraulic cylinder 57 connected at 58 to the boom and at 59 to the carriage.

In operation of the machine, the trailer is positioned in appropriate proximity to the stump 22 and anchored in place by the trailer hitch 12. As will be understood, while the vehicle is traveling the cutters 21 will be elevated by the boom to ground clearance. At the stump location the cutters are lowered and started in operation at an elevation sufficient to disintegrate the stump exposure, for which purpose the boom may be swung laterally by the actuator 57 within required working range. After disintegration of the stump exposure, the carriage 15 may be elevated by actuator 50 to swing about the wheel axis and in so doing to lower the boom as to the FIG. 2 broken line position. The boom thus lowers the cutters 21 to such subsurface depths as may be required for disintegration of the stump roots.

I claim:

1. A stump removal machine comprising a vehicle having spaced axially aligned wheels, an elongated laterally swingable boom alignable with the longitudinal axis of the vehicle and extending above and across the wheel axis from a boom pivot forwardly of said axis, a motor carried by the vehicle, a rotating stump cutter driven by said motor and carried by an arm depending from and having pivoted connection to the boom near a rear free end thereof, and a carriage mounting the boom for lateral swinging movement about said boom pivot and above said wheel axis, the carriage mounted on the vehicle and there being carriage actuator means for oscillating the carriage to displace said arm and cutter up and down, and arm actuator means carried by the boom to rotatably oscillate the arm about said pivotal connection in the general direction of boom longitudinal extent and independently of carriage movement.

2. A stump removal machine according to claim 1, in which the boom elevation is above the vehicle wheels.

3. A stump removal machine according to claim 1, wherein said carriage is mounted for oscillation about the wheel axis to control the cutting depth of said cutter.

4. A stump removal machine according to claim 3, in which the boom elevation is above the vehicle wheels.

5. A stump removal machine according to claim 1, wherein powered means interconnecting the carriage and boom and operable to swing the boom around said pivot.

6. A stump removal machine according to claim 2, in which said carriage includes means supporting the boom throughout the range of its swinging movements.

7. A stump removal machine according to claim 6, in which said supporting means includes an arcuate track traveled by a boom-carried roller.

8. A stump removal machine according to claim 1, in which said motor is mounted on the carriage and the carriage is oscillated by a power source at the forward end of the carriage.

9. A stump removal machine according to claim 6, in which said motor is mounted on the carriage and the carriage is oscillated by a power source at the forward end of the carriage.

10. A stump removal machine according to claim 1, in which the vehicle includes a forward draft A-frame attachable to a pulling vehicle, and said carriage includes a second A-frame and means for oscillating the carriage frame relative to said draft frame.

11. A stump removal machine according to claim 10, including means supporting the carriage A-frame for oscillation about the wheel axis.

* * * * *